INVENTORS.
DORN L. PETTIT
ROBERT C. MONTROSS
GILDEA HUTCHINSON
BY Myron I. Seibold INVENTORS.
DORN L. PETTIT
ROBERT C. MONTROSS
GILDER HUTCHINSON
BY Myron J. Seibold

ELECTRONIC CONTROL CIRCUIT FOR A.C. MOTORS

Filed June 11, 1956

INVENTORS.
DORN L. PETTIT
ROBERT C. MONTROSS
GILDEA HUTCHINSON
BY Myron J. Geibold

ELECTRONIC CONTROL CIRCUIT FOR A.C. MOTORS

Filed June 11, 1956 6 Sheets-Sheet 4

INVENTORS.
Dorn L. Pettit
Robert C. Montross
Gildea Hutchinson
BY Myron J. Geibold Fig. 8
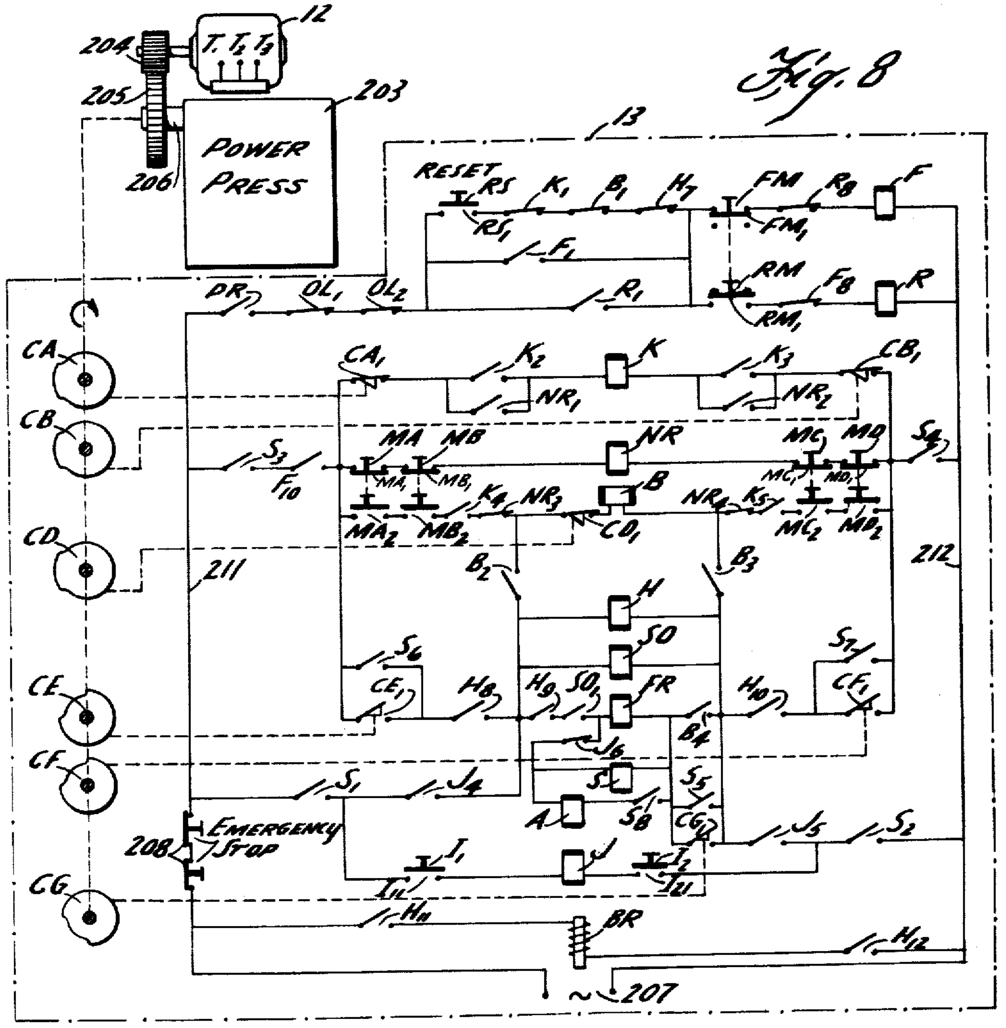
Fig. 8a
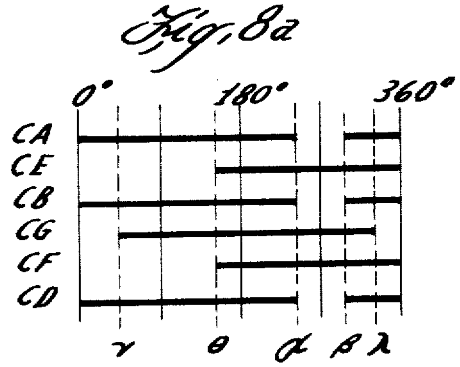
Fig. 8b
| | $S_1$ | $S_2$ | $S_3$ | $S_4$ | $S_5$ | $S_6$ | $S_7$ |
|---|---|---|---|---|---|---|---|
| CONT | | | X | X | X | X | X |
| RUN | | | X | X | | | |
| INCHING | X | X | | | X | | |
| OFF | | | | | | | |
INVENTORS.
DORN L. PETTIT
ROBERT C. MONTROSS
GILDER HUTCHINSON
BY Myron J Geibold

ELECTRONIC CONTROL CIRCUIT FOR A.C. MOTORS

Filed June 11, 1956 6 Sheets-Sheet 6

INVENTORS.
DORN L. PETTIT
ROBERT C. MONTROSS
GILDEA HUTCHINSON
BY Myron J. Geibold United States Patent Office 3,108,215

Patented Oct. 22, 1963

3,108,215
ELECTRONIC CONTROL CIRCUIT FOR A.C. MOTORS

Dorn L. Pettit, Wauwatosa, Robert C. Montross, Thiensville, and Gildea Hutchinson, Milwaukee, Wis., assignors to Square D Company, Detroit, Mich., a corporation of Michigan Filed June 11, 1956, Ser. No. 590,484
6 Claims. (Cl. 318—227)

The present invention relates to electronic contactors and more particularly, to electronic contactors for controlling power to a resistive inductive counter E.M.F. load.

In the operation of heavy machinery such as large power presses, there are two general methods of controlling the power applied. The first method includes running the motor continuously and the control of the equipment is provided by the use of a clutch or other mechanical linkage capable of disconnecting the equipment from the motor or drive. The other method of control permits a direct coupling between the motor drive and the equipment and controlling the power between the power source and the main motor drive.

In the first method employing mechanical control between the machinery and the drive, a great deal of maintenance is necessary to keep the clutches or other control means in operating condition due to rapid wear of the mechanical parts resulting from the large inertia of the equipment. The second method, sometimes referred to as direct press drive, usually employs a magnetic or electrical contactor for control of the main drive motor which is geared directly to the press. Here again much maintenance is necessary in the form of replacement of contact tips which erode quite rapidly due to the large inrush and running currents inherent in the type of motor employed for this service. The erosion of tip material is further aggravated by the opening and closing of contacts for each cycle of operation, this being a requirement because of the direct connection of the motor to the press. In either method, mechanical control of the coupling between the motor and the machinery, or direct drive using electrical magnetic contactors, the shock loading to the gear train often causes damage to gears, shafts and keyways requiring excessive "down" time to permit complete disassembly of the machinery for repair. The constant starting and stopping required during inching operations in power presses exaggerates and intensifies the problems involved in normal operation.

The present invention is directed to an electronic contactor for direct press drive operation overcoming the aforementioned problems. The electronic contactor includes a pair of gaseous discharge devices connected back to back between the power source and the load or motor drive to provide a contactor capable of completing the circuit to the load on alternate half cycles. By controlling the ignition angle of firing of the discharge device whereby the device fires late in the cycle, the starting torque is decreased by reducing the voltage to the load, to cushion the starting torque thereby protecting gears, shafts and keyways in the equipment directly coupled to the motor or electrical load. The feature of controlling the power supplied to the motor during inching operations may be used to reduce the torque and require less inching operations on the part of the machine operator.

By controlling the ignition angle during the starting operation, the firing is initiated late in the cycle and advanced to full on in a few cycles thereby providing cushioning as well as fast starting without reducing the output rate of the press. This feature has been referred to as slope control and in addition to providing cushioned starts for the machinery, also relieves stresses from heating of the motor or load which in the past has caused overheating of rotors and breakage of rotor bars and rings resulting from shock and severe duty cycles involved in direct press drive mode of operation.

The present invention has been illustrated using ignitrons having load fired ignitors which assure firing angles which are coordinated with the power factor of an RL counter E.M.F. load. In certain applications the counter E.M.F. voltage may reduce the firing voltage of the ignitrons. Modifications of the electronic contactor have been shown providing holdoff circuits inserted in the firing circuits in controlling the ignitor current by preventing the thyratron or gaseous discharge device from conducting unless the firing voltage is large enough for breakdown or arcing of the ignitron. The thyratron may be adjusted for firing at a controlled voltage by using variable resistors in a bridging network controlling the grid or adjusting D.C. bias voltage applied to the grid. Two types of holdoff circuits have been included, the first of which is referred to as D.C. holdoff in which holdoff voltage is held at a negative D.C. potential level during the entire operation after the initial starting period, including slope control. The other circuit substitutes an A.C. wave for the D.C. potential, adjusting the phase angle to be negative with respect to the grid during the periods of inadequate firing voltage for firing the ignitrons.

An object of the present invention is the provision of an electronic contactor for symmetrically switching of A.C. power to a load.

Another object is to provide controlled symmetrical switching between a source of A.C. power and a load.

A further object of the invention is the provision of an electronic contactor for controlling power from an A.C. source to a resistive inductive load producing a counter E.M.F.

Still another object is to provide symmetrical switching between a source of A.C. power and an induction motor and controlling the power applied to said motor.

Another object of the invention is the provision of symmetrical switching circuit for controlling the power applied to induction motor driving a power press.

Another object is to provide a circuit for controlling a power press driven directly by an induction motor.

Further objects and features of the invention will be readily apparent to those skilled in the art from the specification and appended drawing illustrating certain preferred embodiments in which:

FIG. 1 is a circuit diagram of the electronic contactor illustrating a preferred embodiment of the invention.

FIG. 1*a* illustrates typical control voltage waveforms in a firing control circuit.

Figure 3:
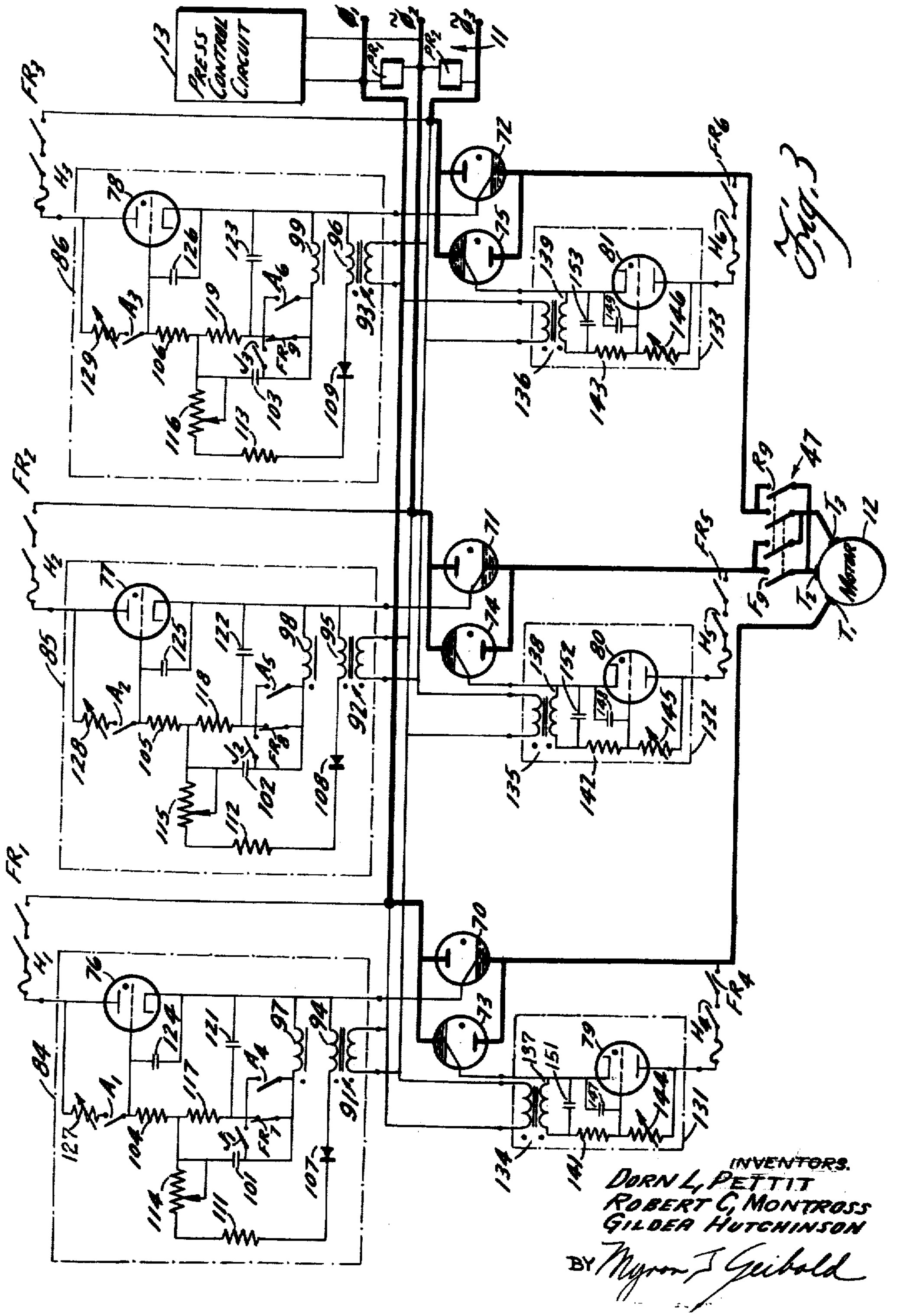
FIG. 3 is a circuit diagram of a modification of the embodiment shown in FIG. 1 showing the additional feature of ignition holdoff control of an electronic contactor.
Figures 3A, 3B:
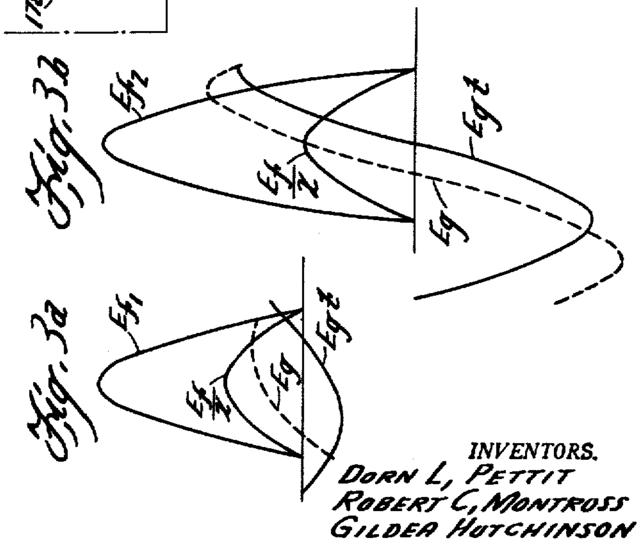

FIG. 3*a* shows voltage waveforms in the firing control circuit of FIG. 3 illustrating the maximum lead angle of the firing to line voltages for a typical motor.

FIG. 3*b* shows voltage waveforms in the control circuit of FIG. 3 illustrating the minimum lead angle of the firing to line voltages for a typical motor.

Figure 4:
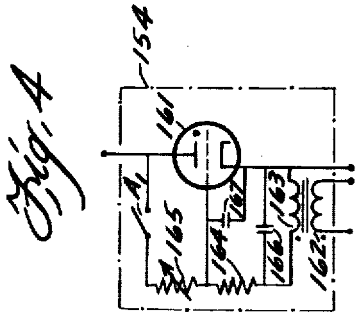

FIG. 4 is a circuit diagram of the firing control circuit employing A.C. holdoff firing control without slope control firing of an electronic contactor.

Figure 5:
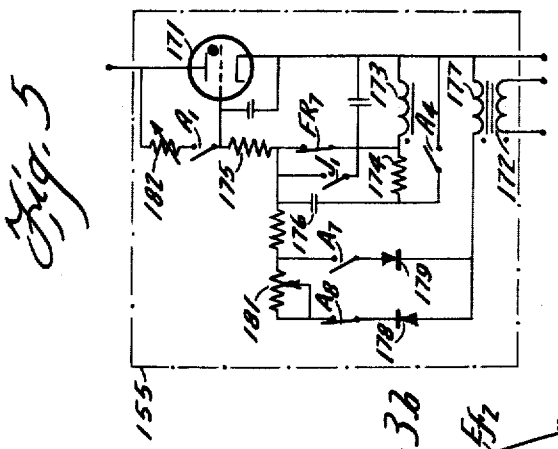

FIG. 5 is a circuit diagram of a D.C. holdoff firing control circuit having slope control firing.

Figure 5A:
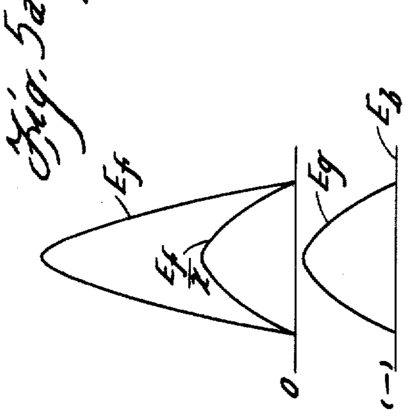

FIG. 5*a* illustrates typical voltage waveforms of the firing control circuit of FIG. 5.

Figure 6:
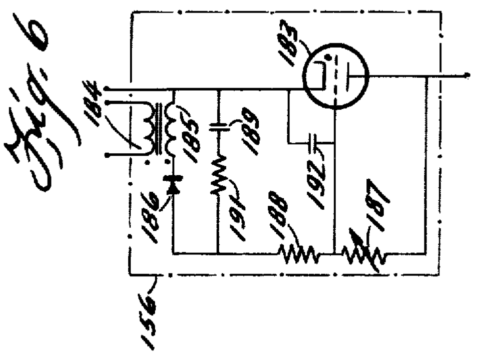

FIG. 6 is a circuit diagram of a modified firing control circuit employing D.C. holdoff and of primary use in the load to line return circuit of the electronic contactor.

Figure 7:
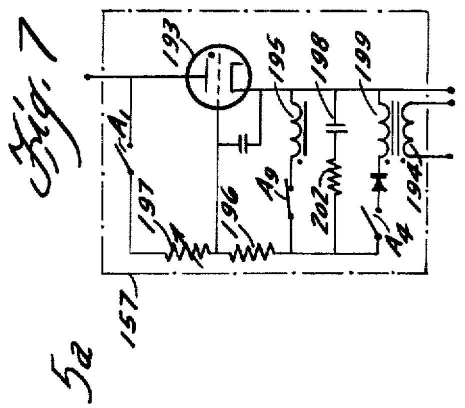

FIG. 7 illustrates a D. C. holdoff firing control circuit without slope control.

FIG. 8 is an electronic contactor relay control circuit for direct drive of power presses.

FIG. 8*a* shows a cam operated operational diagram for the relay control circuit of FIG. 8.

FIG. 8*b* is an operational diagram for the master selector switches of FIG. 8.

Figures 1A, 9, 9A, 9B, 10:
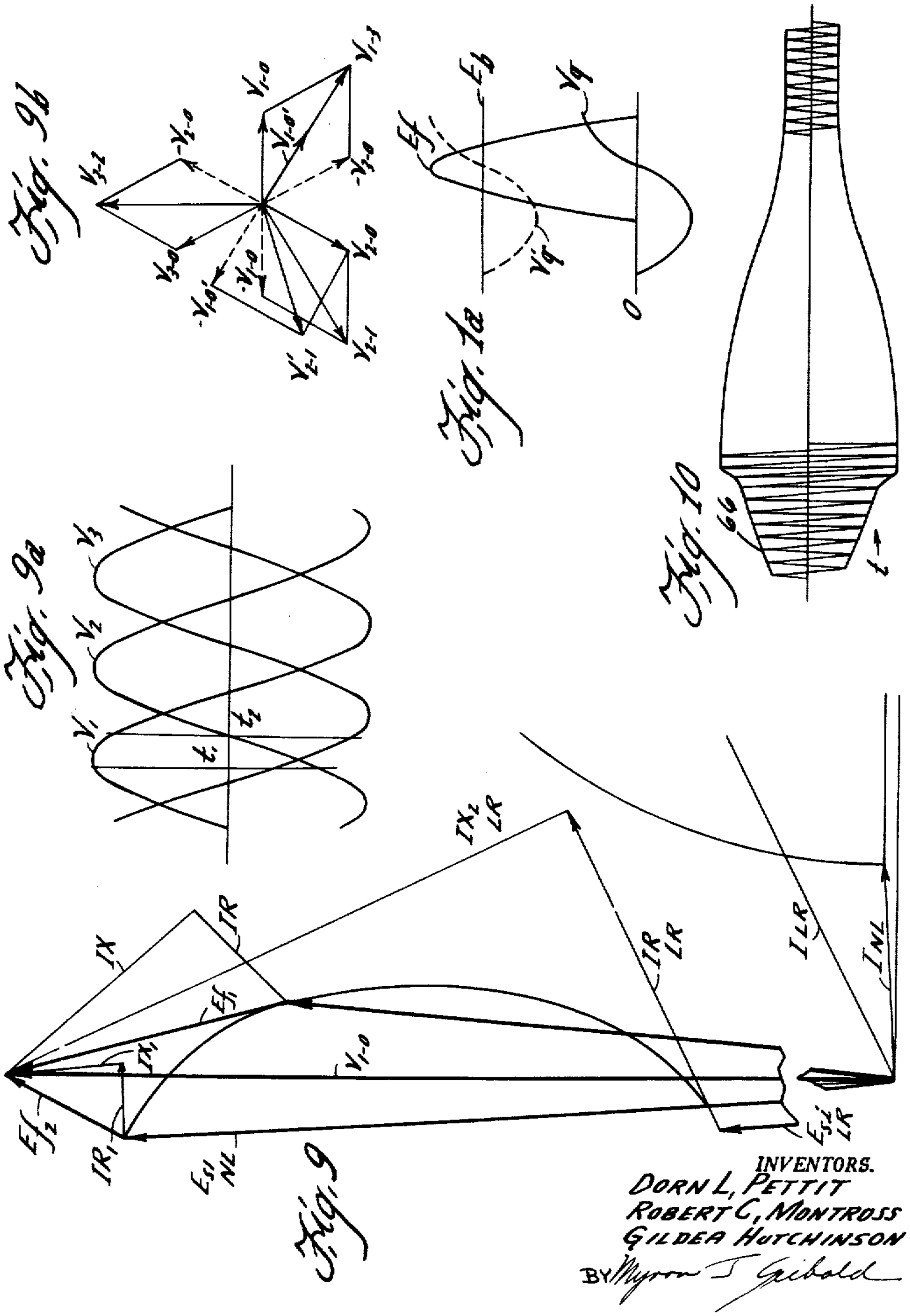

FIG. 9 is a circle diagram of a typical motor showing the locus of self-induced voltages $E_{si}$ and other motor voltage vectors.

FIG. 9*a* illustrates typical line voltage waveforms from a three phase source.

FIG. 9*b* is a vector diagram of line to line and line to neutral voltages in an electronic contactor.

FIG. 10 illustrates typical waveforms of current to a typical load controlled by an electronic contactor of the present invention.

Figure 1:
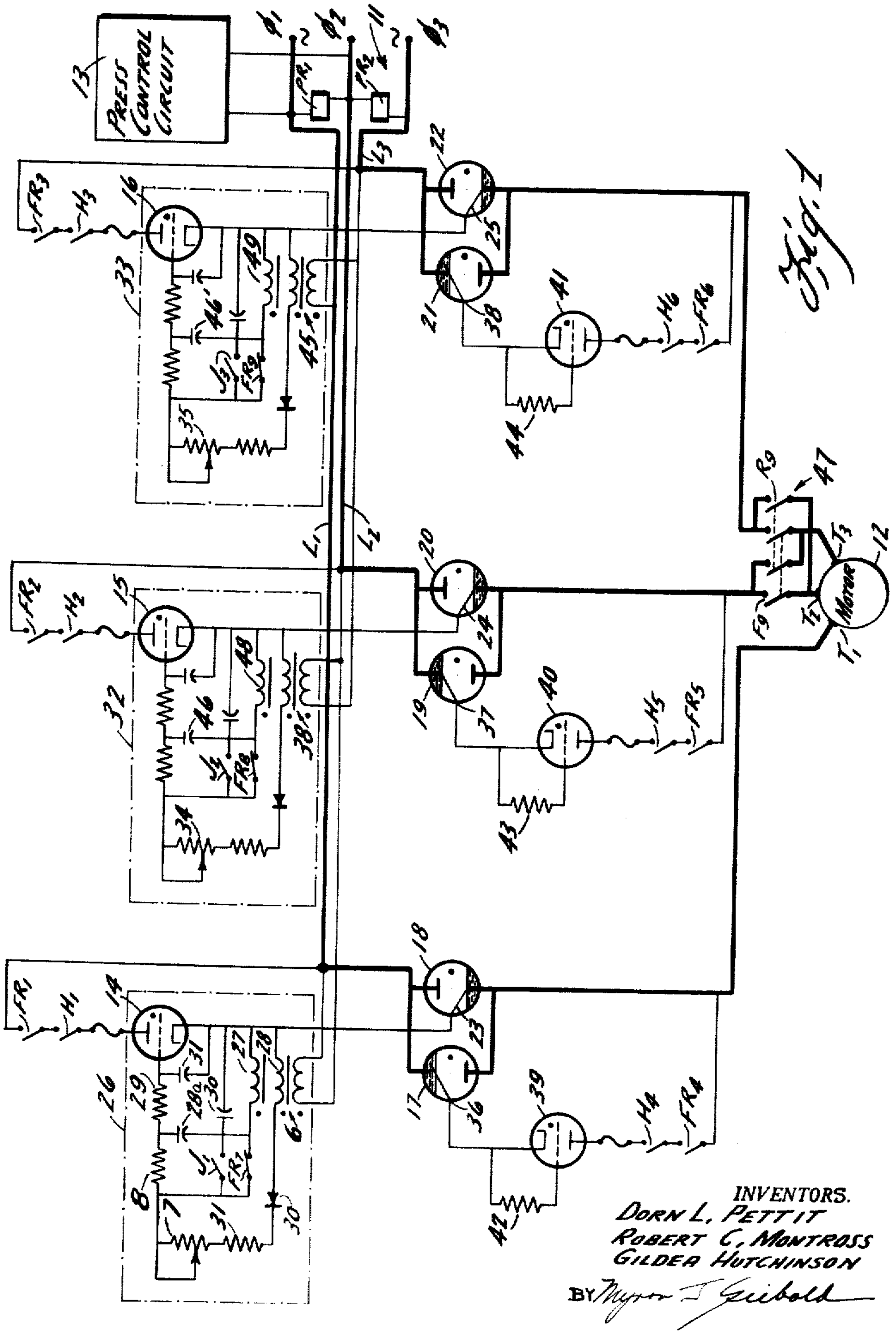

Referring now to the drawings wherein like reference characters designate like or corresponding parts throughout the several views, there is shown in FIG. 1, which illustrates a preferred embodiment, an electronic contactor connecting a polyphase alternating current source 11 to a RL counter E.M.F. load, such as a polyphase induction motor 12, alternating current squirrel cage induction motor, wound rotor induction motor or the like. Phase reversal relay PR1 and PR2 are connected between adjacent lines to assure proper phase sequence coupling to the contactor before operation, that is, the control signal to the firing control circuit or to the grids of thyratrons 14, 15 and 16 is derived from a supply line lagging the anode voltage by 120° to provide the desired firing or ignition angle. In accordance with conventional practice, the ignition angle is measured relative to the phase of the firing voltage $E_f$ on the anode of the discharge device.

Since the present embodiment of the invention was directed to large horsepower motors, coupling was arranged between the supply lines and the motor 12 by gaseous discharge devices having a high energy capacity, and preferably of the mercury pool cathode type. The drawing shows these discharge devices as ignitrons connected in inverse parrallel relation for symmetrical switching from the source 11 to the motor 12. The motor 12 should be considered as representative of an RL counter E.M.F load, wherein ignitrons 17 and 18, connected back to back or inverse parallel, connect the power supply line L1 to the motor; ignitrons 19 and 20 connect power supply line L2 to the motor and ignitrons 21 and 22 connect power supply line L3 to the remaining winding of the motor 12.

Representative supply line voltage waveforms are shown in FIG. 9*a* for the A.C. power supply which is connected to the electrodes of ignitrons 17—22 and thyratrons 14—16 and 39—41 between the source and load. The thyratrons in the firing control circuits are connected in parallel with their associated ignitrons between the lines L1—L3 and the motor, conducting at the proper time to divert a part of the load current through the ignitor to strike an arc in the ignitrons. Firing control circuits 26, 32 and 33 for the thyratrons 14—16 control the ignition angle for firing the thyratrons and regulating the magnitude and timing of the ignitor current.

The firing control circuit 26 is representative of the polyphase electronic contactor control circuits shown in FIG. 1, wherein an A.C. plus D.C. grid phase control signal is coupled to the grid of thyratron 14 for controlling the ignition angle of the thyratrons for the positive half cycle. Grid transformer 6 has a primary connected across L1 and L2, and a secondary 27 coupled to the grid providing an A.C. signal lagging the line voltage across the thyratron 14 by approximately 120°. The grid transformer secondary 28 supplies a charging current through rectifier 30 charging capacitor **28*a* at a rate regulated by resistor 31 and potentiometer 7. Capacitor 28*a*, as controlled by the charging circuit, provides the positive D.C. signal bias on the grid to control the ignition angle wherein the charging rate determines the slope control period. Both the A.C. signal and D.C. bias are coupled to the grid by the current limiting grid resistor 29**.

By controlling the RC time constant in the D.C. grid biasing circuit, the D.C. component of the grid signal, which is superimposed on the A.C. signal, produces the required slope control. The intersection of the grid signal voltage with the critical grid voltage characteristic of the thyratrons 14—16 varies the ignition angle of the thyratrons and the slope control of the ignitrons to provide cushioned starts for the motor 12 and gradual buildup of power in the motor RL counter E.M.F. load. Provision of controlled power or slope control on starting is particularly important in motor loads where the inertia of the system may cause overheating of rotors, breakage of rotor bars and links from the shock cycle and duty cycle.

Capacitors 30 and 31 and resistor 8 in the grid control circuit 26, provide a filter for eliminating high voltage peaks from the line at the grid which are induced in the secondaries 27 and 28 respectively, of the grid transformer 6. The grid control for circuits 32 and 33 are substantially the same as the control circuit 26, described in connection with thyratron 14, wherein the RC time constant of the potentiometers 34 and 35 and condensers 46 and 46' are substantially uniform for all phases, to provide uniform ignition angles and slope control throughout the contactor. The grid transformer 38, in control circuit 32, is connected from supply line L3 to line L2 to provide an A.C. component on the grid which is lagging the voltage on line L2 by 120°. In the control circuit 33, the primary grid transformer 45 is connected across supply lines L1 and L3 to provide an A.C. component on the grid of the thyratron 16 which is lagging the voltage on line L3 by 120°.

The line to motor circuit as described above, includes ignitrons 18, 20 and 22 having thyratrons 14, 15 and 16 respectively, controlling the ignition angle during the period or slope control, after which the positive D.C. bias on the thyratron grids decreases the ignition angle to a point where the thyratrons conduct as soon in the cycle as the ignitron, which is connected back to back, has ceased to conduct current and the anode voltage reaches firing potential. The return circuit to the line from the motor 12 includes ignitrons 17, 19 and 21 having ignitors 36—38 connected to the individual firing control circuits. The grids of the thyratrons 39—41 are shown connected to the cathodes by resistors 42—44 respectively, to provide rectifier operation wherein a predetermined firing voltage and extinction of the ignitron connected in inverse parallel causes the thyratrons to conduct current through the ignitors 36—38 and start conduction of the ignitrons 17, 19 and 21.

A magnetic contactor or reversing 47 may be provided, as shown in the circuit of FIG. 1, in which switch contacts F9 and R9 reverse the direction of phase rotation at the motor terminals T1—T3 by interchanging the phases of the line voltage at two of the motor terminals. Switch F9 has two sets of contacts connecting lines L2 and L3 to terminals T2 and T3 respectively for forward operation of the motor 12; switch R9 also has two sets of contacts connecting lines L2 and L3 to terminals T3 and T2 respectively for operating the motor 12 in the reverse direction. Forward and reverse switches F9 and R9 may be operated by the forward and reverse relays F and R respectively, shown in FIG. 8.

In operation, the motor 12 representative of a RL counter E.M.F. or reactive counter E.M.F. load is energized from a polyphase power source 11 connected to supply lines L1, L2 and L3. The electronic contactor coupling the lines L1, L2 and L3 provide a symmetrical switching circuit for controlling the power applied to the load 12.

Assuming the phase sequence of line voltages as shown by the waveforms in FIG. 9*a* wherein $V_1$ is the voltage on line L1, $V_2$ on line L2 and $V_3$ the voltage on line L3, then the line voltages applied to the thyratrons and ignitrons connected to the respective lines will also be as shown in FIG. 9*a*. Time *t*1 indicated in FIG. 9*a*, represents the random closing of the circuit to the power source 11 and time *t*2, the firing of the thyratron and ignitron connected to line L1 for first half cycle. Assuming therefore that firing relay FR shown in FIG. 8 closes contacts FR1—FR9 shown in FIG. 1 and holding relay H also shown in FIG. 8 closes contacts H1 to H6 shown in FIG. 1 at time *t*1 (see FIG. 9*a*), thyratron 14 will conduct at time *t*2 to strike an arc at the igniter 23 causing ignitron 18 to conduct to connect line L1 to the load 12 during the remainder of the one-half cycle and as long as current flows. Thyratron 41 follows and fires completing the ignitor circuit for ignitron 21 and a return circuit from load 12 back to line L3 through the main electrodes of ignitron 21.

The voltage vector diagram of FIG. 9*b* provides a further aid in analyzing the operation during the first cycle of operation of the electronic contactor through the three phase cycle wherein the line to line voltage $V_{1\text{-}3}$ is applied to thyratron 14 connected to the ignitor 23 and in parallel with ignitron 18. The line to line voltage vector $V_{1\text{-}3}$ is the vector sum of the line to neutral voltages $V_{1\text{-}0}$ to $V_{3\text{-}0}$ applied to ignitron 18 upon completing the ignitor firing circuit. The biasing capacitor 28 is assumed to be completely discharged during the first half cycle and no D.C. potential is impressed on the grid; the A.C. grid signal lags $V_{1\text{-}3}$ by 120° and is in phase with the line voltage $V_{2\text{-}1}$. Grid and anode voltages on thyratron 14 are more fully shown in FIG. 1*a* wherein $E_f$ represents the firing voltage waveform and $V_g$ the A.C. grid signal.

Conduction of the ignitron 18 and completing the circuit from line L1 to terminal T1 and the return circuit from the motor to line L3 through ignitron 21 produces an unbalanced condition shifting the neutral of the three phase system. The voltage applied to fire the ignitron 20 to connect L2 to the terminal T2 is, for the first half cycle of L2, the vector sum of $V_{2\text{-}0}$—$V_{1\text{-}0}'$ and not $V_{2\text{-}0}$—$V_{1\text{-}0}$ or $V_{2\text{-}1}$ as it would be for balanced conditions wherein 0′ has been used to designate the shifted neutral. The vector sum of these voltages is shown as $V'_{2\text{-}1}$ which legs the line to line voltage $V_{2\text{-}1}$ thereby reducing the angle of lag between $V_{2\text{-}1}$ and $V_{3\text{-}2}$ to less than 120°. $V_{3\text{-}2}$ is the source of potential for the grid transformer to supply the lagging A.C. potential to the grid of thyratron 15.

The ignitor circuit 32 for ignitron 20, controlled by thyratron 15, starts its conducting cycle in phase with the line voltage $V_{3\text{-}2}$, since the D.C. biasing circuit has had insufficient time to accumulate a charge on the capacitor 46 from the time *t*1, the instant of closing or energization of the FR relay which causes the opening of break contacts FR8. The return circuit from line L2 through the load 12 is completed through ignitron 17 connected between line L1 and terminal T1. The firing circuit for ignitron 17, including thyratron 39, follows the line to load circuit firing, i.e., ignitron 20, completing the return circuit to line L1.

The last ignitrons to fire in the three phase cycle complete the circuit to the load from supply line L3 to line L2. The firing voltage $V_{3\text{-}2}$ shown in FIG. 9*b* is impressed across ignitron 22 and thyratron 16 in the firing circuit. The ignition angle of thyratron 16 may be decreased due to the D.C. component present on the grid and capacitor 46; advancing the firing angle to gradually increase the current to the load. According to the random starting time *t*1 indicated in FIG. 9*a*, capacitor 46′ has charged over one-half of the positive half cycle. The line to load circuit is completed through ignitron 22 completing a return circuit through ignitron 19. Thyratron 40 completes the firing circuit for ignitron 19 following the firing of ignitron 22. Upon completion of the three phase cycle the current supplied to the load 12 is increased along the slope line 66 indicated in FIG. 10 following the slope or increasing positive bias on the grid. The waveforms for current flowing in one of the supply lines to the load as shown in FIG. 10 indicates a slope time period of approximately nine cycles, providing cushioning as well as fast starting of the load so that the output rate of the load is not reduced. Following the period of slope control the inrush currents maintain the high current amplitudes but gradually taper off to running load current amplitude as the motor approaches typical load conditions following the inrush of starting current.

The slope of load current amplitudes 66 is adjusted by potentiometers 7, 34 and 35 which vary the charging rate of capacitors 28*a*, 46 and 46′ which are coupled to the grids of the thyratrons 14—16 to vary the positive D.C. bias. FIG. 1*a* illustrates the change in positive grid bias and building up to a maximum convenient bias voltage $E_b$ for decreasing the ignition angle and the fixed lagging superimposed A.C. component varying the grid signal from $V_g$ to $V'_g$. As the positive D.C. grid bias potential is increased, the ignition angle is decreased from 120° to 0°. It is readily apparent from an analysis of the waveforms in FIG. 1*a* that the ignition angle is decreased to 0° long before the biasing capacitors are fully charged.

Contacts J1—J3 may be provided to maintain the ignition angle at 120° and prevent the load currents from exceeding an initial predetermined amount as shown by the current amplitude at the start of the slope 66 in FIG. 10. Contacts J1—J3 therefore would be closed at the same instant contacts FR7—FR9 are opened to prevent a positive D.C. potential from accumulating on the biasing capacitors 28*a*, 46 and 46′. The fixed phase lagging A.C. signals are coupled to the grid from the line to line voltages lagging the thyratrons anode voltage by 120° through the secondaries 27, 48 and 49 of the grid transformers 6, 38 and 45.

The circle diagram of the typical motor, showing the locus of self-induced voltages $E_{si}$ or counter E.M.F. of FIG. 9 illustrates, in vector form, the change in firing voltages impressed across the ignitrons and thyratrons of the electronic contactor circuit, and the load currents demonstrating the change in power factor of the typical motor from no load to locked rotor conditions. The significant portions of the current and voltage vectors and certain illustrative impedance triangles have been shown. Since the present system employs load firing wherein the thyratron determines the instant of firing, the ignitor current will be impressed at the instant the firing voltage is available across the ignitron. The change in power factor has been shown to emphasize the need of ignitor current and ignitron voltage coincidence in time to prevent excessive ignitor currents over extended periods substantially decreasing the life of the ignitors and ignitrons. $V_{1-0}$ is the line voltage and $E_{si}$ the self-induced or counter E.M.F. voltage, their vector difference varying the firing voltage $E_f$ from a lagging phase angle relative to the line voltage under locked rotor conditions through a leading phase angle and back to a lagging phase angle under no load conditions. $E_{f1}$ is the firing voltage under load conditions taken at a point along the circle diagram where the firing voltage $E_{f1}$ is leading the line voltage the maximum and $E_{12}$ is the maximum lag angle of the firing voltage $E_f$.

In the present system, as the firing voltages $E_f$ and load currents I vary with changing load conditions, the thyratrons in the firing circuit will follow the change in phase of the firing voltage $E_f$ to supply ignitor current the instant the firing voltage $E_f$ is applied to the ignitron.

The firing circuit, therefore, is independent of varying phase angle between the line voltages and load currents, and will maintain a fixed angle to the load currents, this angle determined primarily by the constants of the load. The lagging currents in the load cause the instant of transfer of the ignitrons to be delayed since a current flowing in one of two ignitrons in one direction will prevent voltage buildup across the ignitron connected in inverse parallel with it, until current in the first ignitron stops flowing. The ignitor current should not flow in the second ignitron until the current through the first ignitron is reduced to zero. The instant the current through the first ignitron goes to zero, the voltage builds up across the second ignitron of the opposite polarity and at this instant the thyratron in the ignitor circuit of the second ignitron should fire, to cause the ignitron to conduct. Load firing therefore, is the simplest and most accurate method of striking an arc in the ignitrons and in particular where line voltage and current phase angles vary with the load conditions.

In the impedance triangles FIG. 9, the IR vectors are shown in phase with the load currents which vary along the current circle diagram and the reactive component of the impedance triangle is as shown, leading the respective load currents by 90°. The remaining leg of the triangle is the vector difference between the counter E.M.F. of the load, or self-induced voltage $E_{si}$, and the line voltage $V_{1-0}$ showing the magnitude and phase of the firing voltage $E_f$ applied to the ignitrons and associated thyratrons. Due to the lag in phase of the load currents I however, the ignitrons connected back to back will not have this voltage impressed across the tube until the current in the one or the other is zero, a time period varying with the power factor of the load.

Figure 2:
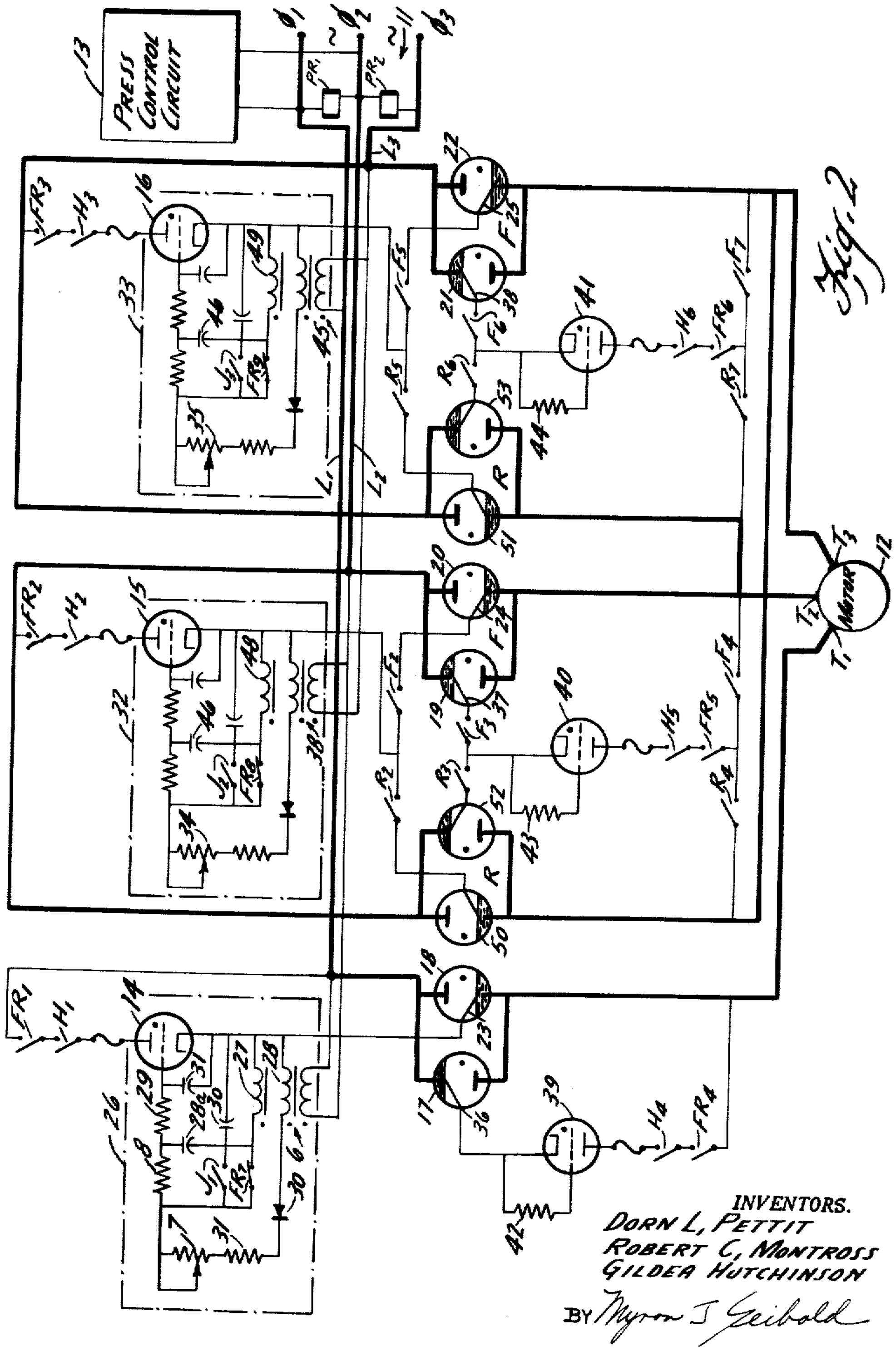
FIG. 2 is a circuit diagram of a modified form of the electronic contactor shown in FIG. 1 to illustrate an electronic reversing circuit.

The electronic contactor of FIG. 2 is a modification of FIG. 1 in which reversal of the load current has been provided in the electronic contactor circuit by paralleling additional pairs of ignitrons connected in inverse parallel. Ignitrons 50 and 51 in the line to load circuit and ignitrons 52 and 53 in the load to line return circuit provide reversal of current in the motor without employing the magnetic contactor or switch 47 as shown in FIG. 1. The reversal of power in the load has been provided by means of forward and reversing contacts between pairs of ignitrons connected to a common supply line and firing control circuits including forward contacts F2 to F7 connecting the firing circuits to ignitrons 19—22 for forward phase rotation of the voltage at the load; forward contacts F2—F4 associated with ignitrons 19 and 20 and forward contacts F5—F7 associated with ignitrons 21 and 22. Reverse contacts R2—R4 connect ignitrons 50 and 52 and revese contacts R5—R7 connect ignitrons 51 and 53 for reversal of phase rotation at the load.

The individual ignitron circuits are substantially the same as the embodiment of FIG. 1 in which the grid transformers in the firing control circuits couple a fixed phase shifted alternating potential to the grid of thyratron 14 wherein the signal lags the line voltage on the anode by 120°. An adjustable D.C. component on the grid is provided by the bias capacitors. An A.C. potential is derived from a secondary of the grid transformers which is rectified and applied across the bias capacitors through series resistors and potentiometers to produce a decreasing ignition angle with increasing positive D.C. potential. As the ignition angle becomes smaller, the thyratrons in control circuits 26, 32 and 33 of FIG. 2 fire earlier in the cycle, decreasing the interval between periods of commutation by striking an arc between the main electrodes of the associated ignitrons earlier in the cycle.

The load return firing circuits for thyratrons 39—41 are substantially the same as shown in FIG. 1 with the exceptions that will be noted later. The load return circuit for the first phase includes ignitron 17 having an anode connected to terminal T1 of the load and a cathode connected to line L1.

The load return firing control circuit for the first phase includes thyratron 39 having its cathode connected to the ignitor 36 of the ignitron 17 and anode connected to terminal T1 through holding relay contacts H4 and firing relay contacts FR4. Since the grid of the thyratron 39 is connected to the cathode by resistor 42 no grid control is attempted and the thyratron is used as a rectifier.

In the three phase circuit shown, reversal of the load requires only that two line to terminal connections be interchanged wherein line L1 remains connected to terminal T1. The second phase on line L2 is switched from terminal T2 to terminal T3 by opening forward contacts F2 disconnecting the thyratron 15 from the ignitor of ignitron 20 and opening forward contacts F3 and F4 disconnecting thyratron 40 in the return control circuit from the ignitor of ignitron 19 and terminal T2 respectively; and closing reverse contacts R2 connecting thyratron 15 to the ignitor of ignitron 50 and closing reverse contacts R3 and R4 connecting the ignitor of ignitron 52 to the cathode of thyratron 40 and the terminal T3 to the anode respectively. The second phase on line L2 is thereby disconnected from the ignitrons associated with terminal T2 to the ignitrons associated with terminal T3 by simply switching the control circuits from one set of ignitrons to another set.

In a similar manner the power from line L3, phase 3 is switched from terminal T3 to terminal T2 without interrupting the power circuit by merely switching the control circuit associated with said line to the auxiliary or reversing ignitrons. The firing circuit is shifted from ignitron 22 to ignitron 51 by opening forward contacts F5 switching the cathode of thyratron 16 from ignitor 25 to the ignitor of ignitron 51 through closed contacts R5 of the load phase reversing relay R. The load return control circuit including thyratron 41 is shifted from ignitron 21 of the power return circuit of line L3 to ignitron 53 by opening forward contacts F6 and F7 of the forward relay and closing contacts R6 and R7 of the reversing relay. The firing circuits are then connected to the ignitrons 51 and 53 coupling line L3, phase 3 to terminal T2 of the motor.

Briefly, reversal of the power through the load in a three phase system is electronically provided by auxiliary sets of ignitrons associated with each of the phases 2 and 3 wherein one line remains connected to one terminal and the remaining phases are reversed in rotation about the first line. In the embodiment shown employing three phases in a polyphase system, forward and reverse sets of ignitrons are provided for each line after the first line having a common firing control circuit for forward and reversing sets for each of said latter lines. The forward sets of ignitrons provide the same phase rotation as the supply lines or phases to which they are connected, i.e., $\phi 1$, $\phi 2$, $\phi 3$ for T1, T2 and T3 in that sequence. The reversing sets of ignitrons provide a phase rotation at the load terminals of T1, T3, T2 producing a reversal of phase rotation at the load. Reversal of the phase rotation of the power applied to the load for other polyphase circuits may be similarly provided, e.g., four phase system by switching of two opposite phases, by auxiliary sets of ignitrons for the respective phases, five phase system by switching four phases and providing auxiliary ignitrons for said four phases and phase reversal at the load, etc.

In operation, the electronic contactor shown in FIG. 2 connects the polyphase source 11 to the motor or load 12 through lines 1, 2 and 3. Following the phase sequence shown by the waveform in FIG. 9*a*, representing the line voltages on lines L1, L2 and L3 wherein the firing relay FR and holding relay H closes at a time *t*1 as indicated in FIG. 9*a*; ignitron 18 will conduct connecting line L1 to line L3 through the contactor and load at approximately the time *t2*. A return circuit path is provided from terminal T3 to line L3 through ignitron 21 which is fired by a rectifier or thyratron 41 completing the circuit through the ignitron 38. The vectorial representation of the line to line voltage applied to ignitron 18 is shown in FIG. 9*b* as $V_{1-3}$; the algebraic sum of voltages $V_{1-0}$ and $-V_{3-0}$. A further analysis of the theory and circuit operation appears to be unwarranted in view of its similarity of FIGS. 1 and 2 in this portion.

Directing the analysis of the operation to the electronic reversing circuit, the line to load connection from lines L1—L3 to terminals T1—T3 is normally provided through ignitrons 18, 20 and 22 and the return from load to line through ignitrons 17, 19 and 21. The phase rotation at the load, referred to as a forward direction for a motor 12, may be provided by energization of the forward relay of FIG. 8 closing forward contacts F2—F7 connecting the firing control circuits to the ignitrons 17—22. Reversal of the phase rotation at the load terminals is initiated by operation of pushbotton FM—RM (FIG. 8) opening contacts FM1 de-energizing relay F, and closing contacts RM1 energizing reversal relay R. De-energization of the forward relay F opens contacts F2—F7 disconnecting the firing control circuit from ignitrons 19—22. Energization of relay R closes reverse contacts R2—R7 connecting the thyratron control circuits for lines L2 and L3 to the ignitors 50—53. Ignitors 50 and 52 connect line L2 to the terminal T3 of the load and ignitrons 51 and 53 connect line L3 to terminal T2 of the load reversing the phase rotation at terminals T1—T3 to T1, T3, T2.

Contacts F2 connect thyratron 15 to the ignitor of the ignitron 20 whereby the power is controlled from line L2 to terminal T2 of the motor. The forward contacts F5 of the forward relay F connect the firing control circuit of thyraton 16 to the ignitor of the ignitron 22 whereby the power is controlled from line L3 to terminal T3 of the load. Contacts F3 and F4 in the load to line return circuit connect the terminal T2 to line L2 through the control circuit via the ignitor or ignitron 37 also connected between the terminal T2 and line L2. Similarly, forward contacts F6 and F7 complete the return circuit from terminal T3 to line L3 through the thyratron 41 and ignitor 38 of ignitron 21 connected between terminal T3 and line L3.

The reversing contacts R2 connect the firing control circuit or thyratron 15 to the ignitron 50 which is connected between line L2 and terminal T3. Reversing contacts R5 connect the control circuit of thyratron 16 to the ignitor of the ignitron 51 connected between line L3 and terminal T2. The return circuit of the electronic phase reversal contactor is completed by contacts R3 and R4 and ignitron 52 connected between terminal T3 and line L2, and reversing contacts R6 and R7 connecting the return firing control circuit to the ignitor of ignitron 53 connected between terminal T2 of the load and line L3. Reversal of the phase rotation at the load produces an energization sequences of T1, T3, T2 rather than T1, T2, T3 for reversing the rotation of the motor 12 or load connected thereto.

The modification shown in FIG. 3 is directed to an electronic contactor providing, in addition to slope control and the other features disclosed in FIG. 1, an A.C. holdoff firing control circuit in the ignitor circuit for each phase. The polyphase supply source 11 is connected to the RL counter E.M.F. load, shown as a motor 12, by lines L1, L2 and L3, ignitrons 70, 71 and 72 between the line and load for the positive half cycles and ignitrons 73, 74 and 75 for the negative cycles and a return circuit to the line.

Thyratrons 76, 77 and 78 are connected in the ignitor circuits of ignitrons 70, 71 and 72 respectively. The control circuit for each thyratron includes an A.C.+D.C. grid control arrangement each of which is substantially identical except for the grid transformer connections to lines L1, L2 and L3. The ignitor or firing control circuits 84—86 derive an A.C. signal lagging the line voltage on the thyratron by 120° from secondaries 97—99. The circuit coupling the A.C. signal to the grid of thyratrons 76—78, includes the series connected D.C. biasing capacitors 101—103 and resistors 104—106 respectively.

The adjustable D.C. biasing circuit controlling the thyratrons 76—78 includes series rectifiers 107—109, resistors 111—113, potentiometers 114—116, charging capacitors 101—103, and resistors 104—106 coupling the capacitors 101—103 to the thyratron grids The discharge path for biasing capacitors 101—103 includes the relay contacts FR7—FR9 and resistors 117—119 in series therewith for regulating the discharge period. Capacitors 121—123 are connected across the grid transformer secondaries 97—99 to suppress voltage surges transmitted from lines L1 to L3, and grid to cathode capacitors 124—126 provide filtering of the grid signal.

Jogging contacts J1—J3 may be connected across firing relay contacts F7—F9 to maintain capacitors 102—103 discharged throughout the operation of the contactor. Acceleration relay contacts A4—A6 when closed for holdoff control operation remove the positive D.C. bias potential on the grid after the slope control period and throughout the remainder of the operation. Acceleration relay contacts A1—A3 and resistors 127—129 couple the grid to the anode after the slope control period to provide A.C. holdoff in the ignitor control circuit by coupling a portion of the line voltage on the anode of the thyratrons 76—78 to the respective grids. The lagging A.C. component derived from secondaries 97—99 is combined vectorially with a portion of line voltage on the anodes of thyratrons 76—78 in accordance with the voltage divider ratio of resistors 127—129 to 104—106 respectively. The voltage resultant of the divider network and secondaries 94—99 determines the firing voltage holdoff of the thyratrons 76—78 wherein the combined A.C. components will prevent firing of the thyratrons below a predetermined firing voltage $E_f$.

As illustrated in FIG. 9, the firing voltage $E_f$ is the vectorial voltage difference between $E_{s1}$ to neutral and line to neutral voltage. The holdoff circuit therefore prevents thyratrons 76 to 78 from firing unless the voltage $E_f$ reaches the minimum firing voltage with its ignitor current necessary to fire the associated ignitron. Elimination of ignitor current for those cycles in which the firing voltage does not reach the predetermined minimum, substantially increases the life of the ignitrons in the electronic contactor since the ignitor would conduct current during a substantial portion of the cycle if the ignitron could not fire due to insufficient ignitor current and voltage $E_f$.

The A.C. holdoff firing circuit waveforms are shown in FIGS. 3*a* and 3*b*; the maximum lagging angle of $E_{gt}$ with respect to the firing voltage $E_f$ is shown in FIG. 3*a* and the minimum lagging angle of $E_{gt}$ is shown in FIG. 3*b* for a typical RL counter E.M.F. load. The shift in phase of the firing voltage $E_f$ is shown vectorially in FIG. 9 wherein the firing voltage $E_{f1}$ is taken along the circle diagram and illustrates the point of maximum lead angle of the firing voltage and $E_{f2}$ the no-load condition which produces the maximum lag angle relative to the line voltage.

In FIG. 3*a*, $E_{f1}$ is impressed across the thyratrons 76—78 and $E_{gt}$ is the fixed lagging A.C. component derived from the grid transformer 91 and taken from across secondary 97. The signal $$\frac{E_f}{x}$$

is the firing voltage $E_{f1}$ divided in accordance with the anode to grid voltage divider ratio, and $E_g$ is the resultant grid signal after combining $$E_{gt}$$

and $$\frac{E_f}{x}$$

where x is divider ratio factor. As $E_{f1}$ varies in magnitude due to changing load conditions $E_{gt}$ remains constant and the resultant grid signal $E_g$ will vary in magnitude proportional to the change in $E_{f1}$ with $E_{f1}$ tending to decrease the ignition angle and advance the firing of the associated thyratron.

Under the conditions of maximum lead of the firing voltage $E_{f2}$, as shown in FIG. 3*b*, the resultant grid signal $E_g$ will be shifted in phase slightly to increase the ignition angle of the thyratron. However, the change in ignition angle is not critical within the range of the load phase shift and the change in holdoff or performance of the circuit is unaffected at the particular load condition since the firing voltage is of such magnitude to provide adequate ignitor current to fire the ignitron and the phasing ahead will not decrease the power applied to the load sufficiently to effect its operation over a period of cycles.

Referring to FIG. 3 and more particularly the return circuit in which ignitrons 73—75 connect the terminals T1—T3 to the lines L1—L3, control circuits 131—133 are connected in the ignitor circuits for controlling the ignitor current and provide ignitor current holdoff. The grid transformers 134—136 in the control circuits are connected to lines L1 to L3 to derive a fixed phase shifted alternating potential only for the grids of thyratrons 79—81 which potential lags the anode voltage by 120°.

The primary of grid transformer 134 in the firing control circuit 131 is connected across lines L1 and L2 to derive the alternating potential fixed in phase relative to the thyratron anode voltage and lagging by 120°. Primaries of grid transformers 135 and 136 also derive alternating potentials fixed in phase lagging the anode voltage of thyratrons 80 and 81 respectively by 120°. Secondaries 137—139 are connected in the grid circuit of thyratrons 79—81 respectively coupling the signals to the respective grids and adding the line to line alternating potential to a portion of the respective line voltage, as divided down by the voltage divider network from the respective anodes.

The voltage divider network for thyratron 79 includes resistors 141 and potentiometer 144 connected in series between the secondary 137 and the anode of the thyratron 79. The tap of the voltage divider is connected to the grid of thyratron 79 thus inserting a portion of anode voltage in series with secondary 137; the capacitor 147 provides filtering for spurious voltages coupled to the grid from the line. The filter capacitor 151 is connected across the secondary 137 for filtering possible transients on lines L1 and L2 to prevent undesired firing of the thyratron 79. In the return circuit for line L2 the firing circuit for ignitron 74 includes thyratron 80 controlled by a grid signal derived from lines L2—L3 providing an alternating potential fixed in phase and lagging the thyratron anode voltage by 120°. The alternating potential is coupled to the grid from the secondary 138 of the grid transformer 135 by resistor 142 which also forms part of the voltage divider, including the variable resistor 145 connected between the grid and anode. The ratio of resistors 145 to 142 determines the magnitude of the voltage derived from line L2 which is coupled to the thyratron grid in combination with the A.C. potential derived from lines L2—L3 determining the holdoff or firing characteristics of the thyratron 80. Capacitors 152 and 148 filter spurious voltages present across lines L2—L3 and any spurious signal coupled to the grid respectively.

In the return circuit to line L3, including the ignitron 75, a firing circuit is provided with the grid controlled thyratron 81. The grid signal includes a line to line signal voltage from line L3 to line L1 which is lagging the voltage on the anode of the thyratron 81 by 120°. The fixed in phase lagging alternating potential from lines L1 and L3 is coupled to the thyratron grid from the grid transformer 136 and specifically secondary 139 which is connected to the grid by the resistor 143. Resistor 143 and 146 form a voltage divider coupling the anode voltage to the grid at the tap whereby the alternating potential from lines L1 and L3 and anode voltage after voltage division is combined vectorially to provide the holdoff control signal for controlling the firing of the thyratron 81. The waveforms and the grid control thyratrons 79—81 are shown in FIGS. 3*a* and 3*b* wherein the anode and grid transformer signals are shown as well as the resultant alternating grid potential $Eg$ providing an ignition angle for holding off the firing of the thyratrons in the ignitor circuits until the firing voltage $E_f$ reaches a predetermined magnitude.

In the operation of FIG. 3, power is supplied to ignitrons 70—75 and the associated firing circuits 84—86 and 131—133 from lines L1 to L3. The circuits from the lines to the ignitors are completed by closing the switch contacts FR1—FR6 and H1—H6 connecting the lines L1—L3 and terminals T1—T3 to the respective thyratrons. Break contacts FR7—FR9 in the line to load firing circuits are opened to permit the capacitors 101—103 to be charged from the secondaries 94—96 through rectifiers 107—109. Potentiometers 114—116 are adjusted to provide the desired slope control or time rate of advance of the ignition angle of thyratrons 76—78 respectively. After or during the period of slope control, acceleration make contacts A1—A6 are closed wherein contacts A1—A3 for thyratrons 76—78 respectively complete the anode to grid circuit through resistors 127—129 to provide an A.C. holdoff signal for the thyratrons in accordance with the voltage divider ratio when combined with the lagging A.C. grid signal derived from secondaries 97—99 respectively.

Contacts J1—J3 are closed at the beginning of a cycle of operation when it is not desirable to place a positive D.C. potential on the grids to decrease the ignition angle and thereby increase the voltage applied to the load. Contacts FR7—FR9 are assumed to be break contacts operated simultaneously with the contacts FR1—FR6; therefore contacts J1—J3 provide a discharge path for capacitors 101—103 upon opening of contacts FR7—FR9; the remaining FR contacts are provided for a purpose that will be more fully described later.

As in the operation of FIGS. 1 and 2, the ignitrons 70—72 in the line to load circuit are controlled by the respective firing circuits 84—86 to permit a tapered increase in voltage applied to the load during the slope control period by increasing the D.C. potential on the thyratrons 76—78 and thereby decreasing the ignition angle. As the ignition angle is decreased, the ignitrons 70—72 conduct earlier in the cycle, increasing the voltage applied to the load as the slope control period progresses. Thyratrons 79—81 in the load to line return firing circuit for ignitrons 73—75 respectively, follow the firing of and conduct with the line to load circuits. The A.C. holdoff circuits, in both the line to load and load to line firing circuits, vary the ignition angle of the thyratrons with firing voltage $E_f$. As the firing voltage $E_f$ decreases with an increased counter E.M.F. or self-induced voltage $E_{si}$ of the load, the ignition angle increases to prevent the thyratrons individual to each ignitron from firing in the event the voltage $E_f$ is inadequate to provide sufficient ignitor current for firing the ignitrons. The A.C. holdoff signal therefore, will prevent the thyratrons in the ignitor circuit from firing unless the voltage $E_f$ placed across the ignitor is high enough to assure striking of an arc across the main electrodes of the ignitor. In essence, the A.C. potential coupled to the grid from the anode of the thyratrons when combined with the A.C. potential fixed in phase and coupled to the grid from the line through the grid transformers, provides a grid control signal whose phase angle is negative during periods of low amplitude firing voltage $E_f$ to eliminate excess ignitor currents or ignitor current flow during periods in which the voltage is insufficient to strike an arc across the ignitron.

The holdoff voltage or A.C. potential is not applied to the grid of the thyratrons in the firing circuits until the acceleration contacts or the acceleration relay A, in the press control circuit 13, have been operated which simultaneously removes the positive D.C. bias from the grid by discharging condensors 101—103 through contacts A4—A6. The A.C. holdoff signal voltage applied to the firing circuits may reduce the voltage or current to the load by increasing the ignition angle when the counter E.M.F. of the load builds up reducing the firing voltage $E_f$. This mode of operation e.g.; reducing the power to the load over a number of cycles because of holdoff in the thyratron circuits, will reduce the motor speed and the counter E.M.F. and as the counter E.M.F. decreases, the increasing firing voltage decreases the ignition angle to apply additional power to the load each cycle as a result of the ignitrons conducting earlier in each half cycle.

The A.C. holdoff control signal is also applied to the firing circuit of the ignitrons in the load to line return circuit. Thyratron grid control circuits 131—133 combine the fixed phase shifted alternating potential and respective portion of the line voltage to the thyratron grids to holdoff ignitor current in the ignitrons 73—75 when there is insufficient firing voltage $E_f$ to strike an arc in said ignitrons.

The firing circuit shown in FIG. 4 is a modification of the firing circuits 84, 85 or 86 and may be substituted therefore, in those instances in which the slope control feature is undesirable or unnecessary. It includes a grid controlled thyratron circuit for controlling the current to the ignitors of ignitrons 70—72. The thyratron may be connected in the ignitor circuit of ignitrons 70—72 by connecting its anode to a common line with the anode of the ignitron preferably in series with the H and FR contacts in the thyratron anode circuit, and the thyratron cathode to the ignitor. Grid transformer 162 is connected across a pair of supply lines to provide a fixed phase shifted alternating potential which may be coupled to the thyratron grid by grid transformer secondary 163 and resistor 164. A portion of the line voltage common to the ignitor and thyratron anode is connected in series in the grid circuit and added vectorially to the fixed phase shifted A.C. component by closing the make contacts A1, operated by acceleration relay A preferably a short time after energization of the FR relay, closing contacts FR1—FR3. Resistor 165 is provided in the anode to grid circuit to adjust the voltage divider ratio of resistors 164 and 165 and control the A.C. holdoff potential applied to the grid. As in the control circuits 84—86 the holdoff potential controls the ignition angle of the thyratrons in the firing circuit to prevent firing on one-half cycles or periods when the ignitor current or voltage $E_f$ is insufficient to strike an arc across the main electrodes of the ignitron. Capacitors 166 and 167 provide filtering for the grid signals to prevent spurious voltages on the line causing uncontrolled firing of the thyratron. The characteristic signal waveforms of the circuit of FIG. 4 are shown in FIGS. 3*a* and 3*b* wherein the fixed phase shifted alternating potential $E_{gt}$ is combined with the A.C. holdoff signal $$\frac{E_f}{x}$$

to provide a resultant grid signal $E_g$.

The circuits in FIGS. 5 through 7 disclose modifications of the holdoff circuit shown in FIG. 3 in which the circuits of FIGS. 5 or 7 may be substituted for each of the control circuits 84, 85 or 86. The circuit of FIG. 5 discloses slope control, holdoff, and A.C. control of the firing of the ignitor circuit. Thyratron 171 may be connected in the ignitor circuit of ignitron 70—72 by connecting the anode to a common line with the ignitron anode, preferably through the H and FR make contacts and connecting the cathode to the ignitor.

The grid of thyratron 171 is connected to the grid transformer 172 for coupling a fixed phase shifted alternating potential from across a pair of lines of L1—L3 as shown in the line connections of the grid transformers of FIG. 3. The grid connection includes resistors 174, 175 and capacitor 176 in series with the grid transformer secondary 173. Alternate paths include contacts J1 or FR7 bypassing resistor 174 and capacitor 176. However, in normal operation break contacts FR7 are opened at the beginning of the cycle of operation for charging the capacitor 176 placing a positive D.C. potential on the grid and decreasing the ignition angle or phase back of the signal on the grid of thyratron 171. Contacts J1 however, may be provided to prevent the charging of capacitor 176 and placing said D.C. potential on the grid thereby limiting the power applied to the load, and would be closed at the same instant break contacts FR7 are opened.

Transformer secondary 177 provides an alternating potential for charging capacitor 176 through rectifiers 178 or 179 to provide respectively a positive or negative D.C. potential on the grid. Acceleration break contacts A8 and make contacts A1 and A7 are operated after the period of slope control to open the slope control circuit and close the holdoff circuits. The slope control circuit operates in a manner similar to the slope control provided in firing circuits of FIGS. 1–3 wherein rectifier 178 provides positive pulses for charging capacitor 176 and potentiometer 181 is varied for changing the charging rate of capacitors 176 for controlling the slope 66. Closure of the acceleration contacts A7 completes the circuit from the grid transformer secondary 177 to charge the capacitor 176 in the opposite or negative polarity providing a negative D.C. bias or potential on the grid of thyratron 171.

Acceleration contacts A1 are closed simultaneously with contacts A7 connecting the grid to the thyratron anode through resistor 182 forming a section of a voltage divider including a resistor 175. The ratio of the voltage divider is adjusted to control the holdoff characteristic as shown in the waveforms in FIG. 5*a* wherein the firing voltage $E_f$ must be of predetermined minimum amplitude when divided down, to drive the grid positive and fire the thyratron 171. Thyratron 171 should not fire unless the firing voltage $E_f$ is large enough to provide adequate ignitor current and to strike an arc between the main electrodes in the associated ignitron. The firing control circuit therefore prevents the firing of thyratron 171 unless firing voltage $E_f$ exceeds a predetermined amplitude during the holdoff period. Acceleration make contacts A4 bypass the source of fixed phase shifted alternating potential derived from secondary 173 during the holdoff control period and provide a return path for capacitor 176.

At the beginning of the cycle of operation, the ignition angle of thyratron 171 is controlled by the fixed phase shifted alternating potential. After the cycle is initiated and during the slope control period, the positive D.C. potential accumulating on capacitor 176 advances the angle of firing to increase the power supplied to the load. After the slope control period, acceleration make contacts A1, A4, and A7 close, bypassing the alternating potential derived from the grid transformer and applied to the grid in series with capacitor 176; and the firing point of thyratron 171 is thereafter controlled by the vector sum of the alternating signal from the thyratron anode and the negative D.C. bias of capacitor 176.

Another mode of operation is provided by make contacts J1 in which the ignition angle of thyratron 171 is held at a fixed lagging phase angle by the grid signal derived from the secondary 173 of the grid transformer 172. The J1 contacts may be maintained closed through the operation of the electronic contactor wherein acceleration contact A1, A4, and A7 are not closed but may be used in combination with other features of the firing control circuit 155.

The firing control circuit of FIG. 6 may be used in electronic contactor ignitron return circuits for controlling ignitrons such as ignitrons 73—75 and in place of the firing circuits 131—133 in FIG. 3. The thyratron and grid transformer connections of the firing circuit 156 are shown having terminal connections which are readily connected in the electronic contactor circuit in place of the firing circuits 131—133, wherein the anode of the thyratron 183 may be connected to one of the terminals T1—T3 preferably through H and FR contacts and the cathode terminal may be connected to the ignitor of one of the ignitrons 73—75. It is preferable, as may be evident from the disclosure, that the control circuits should be consistent; e.g., when the D.C. holdoff circuits 155 or 157 are used to control the ignitrons 70—72; then a D.C. holdoff return circuit such as firing circuit 156 should be used in the load to line return circuit to control ignitron 73—75 wherein individual firing circuits are provided for each ignitron.

Referring to FIG. 6, grid transformer 184 is connected across a pair of lines of the lines L1—L3 to couple a fixed phase lagging A.C. potential to the secondary 185. Negative pulses are passed by rectifier 166 charging condenser 189 through resistor 191 to provide a negative bias for the grid of the thyratron at 183. Resistor 187 forming part of the voltage divider including resistor 188 connects the anode to the grid of thyratron 183 at the divider tap wherein the firing voltage division ratio is determined by the current necessary to strike an arc in the associated ignitron. Resistor 191 is provided to limit the charging rate of capacitor 189 and capacitor 192 provides a filter for the input signal to the grid.

FIG. 7 is an alternate form of the D.C. holdoff firing control circuit as shown in FIG. 5 in which the slope control feature has not been incorporated. In the firing circuit 157, thyratron 193 may be connected across an ignitron in the line to load circuit wherein the anode of thyratron 183 is connected to a line common to the anode of the ignitron preferably through the H and FR contacts and the cathode of the thyratron is connected to the ignitor. The fixed, phase shifted, lagging, alternating potential is coupled to the grid of thyratron 193 by grid transformer 194 having its primary connected to a pair of lines of the supply lines L1—L3. Secondary 195 inductively couples the fixed lagging, alternating potential to the grid of thyratron 193 through break contact A9 and resistor 196 forming part of a voltage divider including a variable resistor 197. After a delay time $t$ make contacts A1 and A4 are closed and break contacts A9 are open. Break contacts A9 disconnect the grid from fixed, phase shifted, lagging, alternating potential and contacts A1, in closed position, complete the circuit from the anode to the grid through the series resistor 197 coupling the firing voltage to the grid in accordance with the ratio determined by the voltage divider. Contacts A4 complete a charging path to capacitor 198 from the secondary 199 of the grid transformer through the series current limiting resistor 202. Capacitor 198 provides negative bias and holdoff potential to prevent thyratron 193 from firing for voltages under a predetermined magnitude, namely: firing voltages insufficient to strike an arc between the main electrodes of the ignitron associated with the firing circuit. Actually the holdoff control is the result of the combination of signals wherein both the negative D.C. potential of capacitor 198 and the ratio of the voltage divider including resistors 196 and 197 control the firing of the thyratron 193. Typical characetristic waveforms including firing voltage $E_f$, the grid signal coupled from the anode of thyratron 193, $$\frac{E_f}{x}$$

the negative bias potential $E_b$ and resulting grid signal $E_g$ are shown in FIG. 5*a*.

In the relay circuit of FIG. 8, a control circuit has been shown for a motor driven machine illustrated in connection with power presses for direct press drive operation. The main drive motor 12 may be connected to the terminals T1—T3 of FIGS. 1–3 for direct drive of the power press 203 by the mechanical linkage including spur gears 204 and 205 and shaft 206. Each rotation of the shaft 206 operates the press through a complete press cycle wherein the top of the press stroke is referred to as the beginning of the cycle. The crank shaft 206 is mechanically coupled to the cam shaft having cams CA, CB, CD, CE, CF and CG controlling associated contacts timing the relay control circuit controlling the electronic contactor.

A source of A.C. supply 207 is provided for the relay control circuit 13 and connected to the set-up, operating, inching and breaking relay control circuits. The power source is connected directly to the braking relay control circuit and to the remainder of the circuits through emergency stop pushbuttons 208. The set-up circuit for operating the press including the electronic contactor and motor drive includes forward and reverse relays F and R having an electrical and mechanical interlock between them. The forward and reverse selector switch FM and RM has a pair of contacts FM1 and RM1 in series with the forward and reverse relays respectively. Phase reversal contacts PR, overload contacts OL1 and OL2 are connected in series with the forward and reverse circuits wherein the phase reversal contacts FR are closed following the proper phase rotation of lines L1—L3 energizing relays PF1 and PR2. Overload break contacts OL1 and OL2 when opened, disconnect the load from the line L1—L3 by the de-energization of both the forward and reverse relays.

A reset pushbutton RS having contacts RS1 is connected in series with contacts K1 of the anti-repeat relay K, contacts B1 of the control relay B and contacts H7 of the holding relay H provides a reset of the F or R relays upon initial energization of the relay control circuit or in the event either the emergency stop buttons 208 are operated or failure of the power supply 207. The forward or reverse pushbutton of selector switch FM, RM is stable in either position, providing a circuit transfer from one of either the forward or reverse relays to the other. Upon operation of the reset button RS, closing of the circuit to the forward or reverse relays circuit is transferred to the line, bypassing the reset button RS through one of either the contacts F1 or R1. The operating or firing relay circuit includes anti-repeat relay circuit including relay K and cam operated contacts CA1 and CB1 in series with the anti-repeat relay K. Anti-repeat relay contacts K2 and K3 are connected in parallel with relay contacts NR1 and NR2 respectively, for closing its own holding circuit. Control relay NR is operated upon closure of master selector switch contacts S3 and S4 and forward contacts F10 connecting the firing relay circuit across the control supply lines 211 and 212.

Manual or run switches MA, MB, MC and MD having contacts MA1, MB1, MC1 and MD1 closing the circuit to the control relay NR are shown for operation individually by each press operator. At least one manual pushbutton is located at each operator's station positioned to prevent the operators from being within reach of the main movable parts of the press during the interval of 0–$\theta$°.

A second control relay B is connected in parallel with relay NR through contacts CD1, NR3, NR4, K4 and K5 and manual pushbuttons MA2, MB2, MC2 and MD2. Operation of manual pushbuttons MA—MD from their normal spring loaded position as shown, de-energizes relay NR and operates relay B for a period of the cycle determined by cam operated contacts CD1 during which time relay B forms the primary operating circuit through the holding relays H, slow operating relay SO, firing relay FR, slow operating relay S, and acceleration relay A.

The holding relay H and slow operating relay SO are connected in parallel with control relay B and cam operated contacts CD1 upon energization of relay B and closure of contacts B2 and B3. Holding relay H closes its make contacts H1—H6 in FIGS. 1, 2 or 3 and break contacts H8—H12 and opens break contacts H7 in FIG. 8. Make contacts H1—H6, FR1—FR6 complete the firing circuit to the thyratrons in the electronic contactor, make contacts H8 and H10 set up the holding circuit to holding relay H and slow operating relay SO. Make contacts H9 in combination with H8 and H10 sets up the holding circuit upon operation of the cam operated contacts CE1 and CF1 for firing relay FR, slow operating SO and acceleration relay A. Slow operating relay SO has a single pair of contacts which are delayed in closing to complete the circuit to firing relay FR, slow operating relay S and acceleration relay A to permit the release of a brake associated with or operated by relay BR during the delay period.

Upon closure of the contacts SO1, firing relay FR operates make contacts FR1—FR6 in FIGS. 1, 2 or 3 to complete the firing circuit and energize or apply power to the motor 12, and opens normally closed break contacts FR7—FR9 in FIGS. 1–3 and 5 to open the discharge path for biasing capacitors in the grid circuits of the thyratrons. Slow operating relay S, acceleration relay A are connected in parallel with relay FR and in series with the normally closed break contacts J6. The slow acting relay S produces a definite time interval before operation of its contacts S8 to close the circuit through the acceleration relay A. Upon completion of the circuit through acceleration relay A, acceleration make contacts A1—A6 are closed to complete the holdoff circuits in the grid control of the thyratrons in FIGS. 3, 4, 5 or 7 and acceleration make contacts A7 in FIG. 5; and open normally closed acceleration break contacts A8 and A9 in FIGS. 5 and 7 respectively. Acceleration contacts A8 and A9 interrupt the positive charging path of capacitor 176 providing the positive D.C. bias for slope control of the electronic contactor.

The inching relay contact network is connected in parallel with the operating or main control relay circuit and includes an inching relay J connected in series with contacts S1 and S2 and inching pushbuttons contacts I11 and I21 of inching pushbuttons I1 and I2 respectively. The inching operational circuit through the contacts J4 and J5 of the inching relay completes the circuit through the firing relay by energizing holding relay H, slow operating relay SO, closed contacts H9 and SO1 respectively, and switch contacts S5. Normally closed relay inching contacts J6 are opened upon operation of the relay J disconnecting relays S and A to prevent operation of the acceleration contacts whose circuits decrease the ignition angle and increase the power applied to the load or motor 12. Inching relay make contacts J1—J3 may be provided as shown in FIGS. 1–3 to complete a discharge path for the biasing capacitor and prevent a positive charge from accumulating thereon to decrease the ignition angle. During the inching operations therefore, the ignition angle remains at the fixed phase shifted A.C. potential as applied to the grid and contacts J1—J3 shunt opened firing relay FR break contacts FR7—FR9 in FIGS. 1–3, 5. Contacts J1 in FIG. 5 provide a discharge path for capacitor 176 to prevent either a negative or positive D.C. potential from accumulating thereon to bias the grid of the thyratron 171.

Braking relay or solenoid BR is connected across the supply lines 211 and 212 for the relay control circuit through contacts H11 and H12 of the holding relay. Energization of the relay BR upon closure of holding contacts H11, H12 operates an air valve or the like to release a brake on the press drive shaft which is normally applied to the shaft upon de-energization of the relay BR.

*Relay Control Circuit Operation*

The time period of operation of the cam operated contacts CA1—CG1 has been depicted, in FIG. 8*a*, over a complete press cycle, and a master switch index key has been shown in the chart in FIG. 8*b* for the various modes of operation. In FIG. 8*b* spaces marked designate closure of the master switch contacts shown at the top of the column wherein "continuous" operation, selector switches S3, S4, S5, S6 and S7 are closed, completing the circuit to the operating circuit relay network from the lines 211 and 212. Switch contacts S5 bypass or shunt cam operated contacts CG1 and control relay contacts B4 in the firing relay circuit, and contacts S6 and S7 shunt cam operated contacts CE1 and CF1.

Upon energization of the lines 211 and 212, through emergency stop pushbutton contacts 208 and the electronic contractor in the proper phase rotation, phase reversal relays PR1 and PR2 are operated to close make contacts PR. The set up relay contact network is prepared for forward or reverse operation of the press by closing reset contacts RS1; overload relay contacts OL1, and OL2 are normally closed to complete a set-up path through the anti-repeat relay break contacts K1, control relay break contacts B1 and holding relay break contacts H7. The position of the forward and reverse pushbuttons FM and RM and closure of associated contacts FM1 or RM1 determines the energization path to either forward relay F or reverse relay R. Operation of either the forward or reverse relays closes either the contacts F1 or R1 to bypass the reset circuit network and form its own holding circuit path. The operation of forward relay F may be used to close or control the closure of forward contacts F9 in FIGS. 1 and 3 to connect lines L2, L3 to terminals T2, T3 respectively for forward rotation of the motor or load 12. Energization of the reverse relay R may close or control the operation of reverse contacts R9 in FIGS. 1 and 3 to connect lines L2, L3 to terminals T3, T2 respectively and energize the motor or load 12 for rotation in the reverse direction.

Forward make contacts F2—F7 complete the control path from the firing circuit to the ignitrons, connecting lines L2, L3 to terminals T2, T3 respectively in FIG. 2 for forward rotation of the motor or load 12. Reverse make contacts R2—R7 in FIG. 2 complete the control path from the firing circuit to the ignitrons connecting lines L2, L3 to terminals T3—T2 respectively upon energization of relay R for reverse rotation of the motor 12 via the inching circuit. Additional forward and reverse break contacts F8 and R8 are included in series with the reverse and forward relays respectively to assure de-energization of one relay upon energization of the other.

Completing the control path through the operating circuit for "continuous" operation of the power press 203, includes closure of the selector switch contacts S3, S4 and forward make contacts F10. As shown, forward make contact F10 provide energization of the operating circuit only upon energization of the forward relay to provide forward rotation of the press.

With the run pushbutton MA—MD in the position shown in the drawings, closing contacts MA1—MD1, control relay NR is operated, closing contacts NR1, NR2 in the non-repeat relay network, including relay K. The non-repeat relay network includes also cam operated contacts CA1 and CB1 which are closed during 0 to $\alpha$ degrees and $\beta$ to 360° (FIG. 8*a*) of the press cycle. Upon operation of relay K holding contacts K2 and K3 are closed to maintain operation of the K relay upon dropping out of the control relay NR and opening of the make contacts NR1 and NR2.

In addition to operating the pushbuttons MA—MD to initiate control relay B, contacts K4—K5 must be closed and contacts NR3 and NR4, therefore relay K, must be operated an relay NR released by opening the contacts MA1—MD1 associated with the run pushbuttons MA—MD. During the initial portion of the cycle as indicated in FIG. 8*a*, cam operated contacts CD1 are closed from 0 to $\alpha$ degrees and $\beta$ to 360°. Therefore, upon closure of contacts MA2—MD2 by operation of pushbuttons MA—MD, the control path for relay B is completed, closing make contacts B2 and B3 to complete the operating circuit from the supply lines 211, 212 to holding relay H and slow operating relay SO. The relay SO is slow operating to allow complete release of the brake for the press before closing the circuit to the firing relay FR wherein the contacts of the firing relay FR complete the electronic contactor circuit to supply power to the load.

The initial control path for operating relay FR is completed through contacts B2 and B3 and pushbutton contacts MA2—MD2 must remain closed until the holding circuit is completed by holding contacts H8 and H10 wherein cam operated contacts CE1 and CF1 are shunted by switch contacts S6 and S7. The initial control circuit for relay FR is completed upon closure of slow operating relay make contacts SO1.

Operation of the firing relay FR and holding relay H completes the firing circuit to the thyratrons in the electronic contactor which are maintained closed after opening the initial control circuit through a holding circuit including switch contacts S3, S4, forward relay contacts F10, switch contacts S6 and S7 by shunting CE1 and CF1, holding relay contacts H8, H10 and switch contacts S5, bypassing relay contacts B4, and cam operated contacts CG1. The initial control circuit may be opened by release of the run buttons MA—MD or cam operated contacts CD1 which open at $\alpha$ degrees. In addition to run buttons MA—MD opening the initial control path at the contacts MA2—MD2, energization of the control relay NR opens break contacts NR3 and NR4.

The firing relay circuit including relays H, SO and FR will remain energized through the holding circuit including contacts S6, S7 and H8 and H10. The press would normally be stopped then by pushing emergency stop pushbuttons 208 although opening selector switch contacts S3 and S4 will stop the press.

Referring to FIG. 8*b*, in the Run column of the index of operation for selector switch position, the contacts of selector switches S3 and S4 only are closed, completing the portion of the control path from lines 211, 212 to the operating circuit. In the "Run" mode of operation the press drive is de-energized by releasing relay FR upon opening of the cam operated contacts CG1 at $\lambda$ degrees wherein the press coasts the remainder of the cycle depending upon the time period for operation of the brake after opening of contacts H11 and H12 and the circuit including the relay or solenoid BR.

Holding relay H and slow operating relay SO remain operated after the firing relay circuit is opened at cam operated contacts CG1. Cam operated contacts CE1 and CF1 completing the holding circuit for relays H and SO open at 360°. Holding contacts H11 and H12 release upon re-energization of holding relay H, opening the circuit to the braking solenoid BR to apply the brake to the power press.

In the present application of the control circuit, provision was made for the release of the run buttons MA—MD, in the "Run" operation, after the press has reached 0°, where there is no opportunity for the operators to insert a hand, arm or other member in the press but free them to remove the piece of material operated on by the press and insert a new piece of material on the up stroke. Control relay NR may be operated by release of the Run pushbuttons MA—MD at $\beta$ degrees in the press cycle to permit emergization of relay K upon closure of cam operated contacts CA1, CB1 at $\beta$ degrees. After $\beta$ degrees and before 360°, pushbuttons MA—MD may be operated to close contacts MA2—MD2 opening contacts MA1—MD1, releasing relay NR and closing contacts NR3 and NR4 to complete the circuit through relay B, including cam operated contacts CD1 and closing the initial control path to holding relay H and slow operating relay SO. The initial control circuit and firing relay circuit is thereby completed through contacts B4 of the firing relay circuit path. Since the press does not stop before reaching 360° when the brake is applied, "on the hop" operation in the Run selection is provided by completing the initial circuit to the holding relay. Holding relay H prevents the brake from being set even after cam contacts CE1 and CF1 open, and firing relay FR is energized through the firing relay circuit including contact SO and B4.

The inching operation is usually employed for setting up the dies or repairing the press and referring to FIG. 8*b*, the index indicates that selector switch contacts S1, S2 and S5 are closed wherein switch contacts S5 bypass cam operated contacts CG1 to permit energization of the firing relay FR throughout the press cycle. Selector switch contacts S1, S2 complete the circuit from the control supply lines 211 and 212 to the contacts of the Inching pushbuttons I1 and I2. Operation of the pushbutton I1 and I2 completes a circuit to inching relay J to operate make contacts J4 and J5 and energize holding relay H, slow operating relay SO, and firing relay FR after closure of the slow operating contacts SO1. The delay period of the SO relay permits complete release of the brake associated with relay BR energized through make contacts H11 and H12 of the holding relay. The inching relay may include make contacts J1—J3 in the electronic contactor firing circuits of FIGS. 1–3 and 5 which close upon energization of relay J to form a discharge path for the D.C. biasing capacitor preventing a D.C. potential from being placed on the grid of the thyratron in the firing circuit. During inching then, the ignition angle may be maintained large to limit the power applied to the load 12. The inching circuit may be operated directly without either relay J or phasing back the thyratrons by operating contacts J4 and J5 directly.

Further modifications are shown in FIGS. 3–5 and 7 wherein holdoff circuit have been provided; and additional relay network is shown in FIG. 8 including relays S and A in parallel with the firing relay FR. The slow operating relay S has been included having contacts S8 in series with the accelerating relay A to provide a delay period before the holdoff circuits are included in the firing circuits of FIGS. 3–5 and 7. This time period allows for the period of slope control before the holdoff circuits control the ignition voltage of the thyratrons in the electronic contactor. Normally closed relay contacts J6 have been inserted in series with slow operating relay S and accelerating relay A to prevent control of the firing circuits by the holdoff circuits included by the acceleration relay contacts during the inching operation.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

We claim:

1. In a system for controlling power to an induction motor from an A.C. source, in combination, an electronic contactor for regulating the power to said motor, a relay control circuit for controlling the mode of operation of said contactor, said contactor having individual power and firing control circuits for each phase of said source, each of said firing control circuits including individual circuits for different modes of controlling the power circuit, said relay control circuit including operating circuit means for operating a first individual circuit for a first mode of operation, acceleration circuit means including slow operating means in said operating circuit for energizing said acceleration circuit means a short time period after said firing control circuit is operated to operate a second circuit in said firing control circuit to change to a second mode of controlling the power circuit.

2. In a system for controlling power to an induction motor from an A.C. source, in combination, an electronic contactor for regulating the power to said motor, a relay control circuit for controlling the mode of operation of said contactor, said contactor having individual power control circuits for each phase of said source, each of said power control circuits including control circuits for regulating the time of the conducting portion of the phase cycle, said relay control circuit including operating circuit means for operating a first control circuit to connect said power control circuit to said source to operate said contactor and increase the conducting portion of the phase cycle, acceleration circuit means including slow operating means in said operating circuit for energizing said acceleration circuit means a short time period after said power control circuit is operated to operate a second circuit in said power control circuit, said second circuit including circuit means for detecting the voltage applied across said contactor to limit conduction to phase cycles wherein adequate voltage is applied to said contactor.

3. In a system for controlling power to an induction motor from an A.C. source, in combination, an electronic contactor for regulating the power to said motor including a power circuit and firing control circuits for each phase, said power circuit having a pair of ignitrons in a series circuit with each phase and connected in inverse parallel, a firing control circuit including a unidirectional conducting device for each ignitron connected to the ignitor and in parallel with the ignitron, one of said devices for each phase and of the same polarity for all phases having a control electrode and control electrode circuit, said control electrode circuit including circuit means for coupling a lagging A.C. signal component to the control electrode, said coupling circuit including circuit means for shifting the phase of said A.C. component for controlling the ignition angle of said controlled device, said circuit means for shifting the phase of the A.C. component including a bias capacitor connected in series with the control electrode and source and an individual charging circuit for increasing the D.C. potential on said capacitor to decrease the ignition angle of said controlled device, variable circuit means in said charging circuit for varying the rate of charging said capacitor and means for initiating the charge and discharge of said capacitor whereby the current to said motor is increased on an opening taper controlled by the ignition angle of said controlled devices.

4. In a system for controlling power to an induction motor from an A.C. source, in combination, an electronic contactor for regulating the power to said motor including a power circuit and firing control circuits for each phase, said power circuit having a pair of ignitrons in a series circuit with each phase and connected in inverse parallel, a firing control circuit including a unidirectional conducting device for each ignitron connected to the ignitor and in parallel with the ignitron, one of the devices of the same polarity for all phases comprising a thyratron having a control grid, anode and cathode, an A.C. plus D.C. grid control circuit said grid including circuit means for coupling a lagging A.C. signal component to the grid, said A.C. coupling circuit including circuit means for shifting the phase of said A.C. component for controlling the ignition angle of said thyratron, said circuit means for shifting the phase of the A.C. component including a source of D.C. potential connected in series with the circuit coupling said A.C. component to the grid and means for varying the D.C. potential in series with said A.C. coupling circuit to vary the ignition angle of said thyratron, variable circuit means in said D.C. potential means for varying the rate of the D.C. potential to be included in series with said A.C. component to control the slope of the power applied to said motor.

5. A circuit for controlling a power press having an induction motor drive energized from a polyphase source comprising; an electronic control circuit for controlling the power to said motor, set up circuit means having alternate control paths for energizing either forward or reverse means, said circuit means including means for electrically locking out the other control path upon energizing a first path, said forward and reverse means having respective operating means in at least two phases of the electronic control circuit, said operating means for said forward means preparing said electronic control circuit for energizing said motor in a phase sequence rotating said motor in a forward direction and said operating means for said reverse means operating to prepare said electronic control circuit for energizing said motor in a phase sequence for rotating said motor in a reverse direction, an operating circuit having forward operating means in series therewith and a firing circuit means having operating means to complete said electronic control circuit for forward rotation of said motor, acceleration circuit means including a slow operating means and an acceleration control means, said slow operating means being connected to be energized simultaneously with said firing circuit means to operate said acceleration means after a delay period, said acceleration means having operating means in said electronic control circuit, said electronic control circuit having means responsive to said acceleration operating means to control the power applied to said motor from said source.

6. The circuit for controlling a power press of claim 5 having circuit means for providing an inching operation of said power press including a relay having operating means for completing an alternate control path to said firing circuit means and in series with said acceleration circuit for disabling said accelerating means.

References Cited in the file of this patent

UNITED STATES PATENTS

| | | |
|---|---|---|
| 1,944,756 | Quarles | Jan. 23, 1934 |
| 2,663,834 | Large et al. | Dec. 22, 1953 |
| 2,703,860 | Large et al. | Mar. 8, 1955 |
| 2,771,574 | Wetter | Nov. 20, 1956 |

UNITED STATES PATENT OFFICE

CERTIFICATE OF CORRECTION

Patent No. 3,108,215 October 22, 1963

Dorn L. Pettit et al.

It is hereby certified that error appears in the above numbered patent requiring correction and that the said Letters Patent should read as corrected below.

Column 4, line 58, after "reversing" insert -- switch --; column 5, line 49, for "legs" read -- lags --; column 6, line 69, for "$E_{12}$" read -- $E_{f2}$ --; column 7, line 52, for "revese" read -- reverse --; column 9, line 22, for "pushbotton" read -- pushbutton --; line 60, for "sequences" read -- sequence --; column 16, line 34, for "FR" read -- PR --; line 54, after "includes" insert -- an --; column 19, line 63, for "re-energization" read -- de-energization --; column 20, line 17, for "contact" read -- contacts --; line 45, for "circuit" read -- circuits --.

Signed and sealed this 7th day of July 1964.

(SEAL)
Attest:

ERNEST W. SWIDER

Attesting Officer

EDWARD J. BRENNER

Commissioner of Patents